UNITED STATES PATENT OFFICE.

BERNARD DOUD, OF CORTLAND, NEW YORK, ASSIGNOR TO HIMSELF AND A. HOLMES, OF SAME PLACE.

IMPROVED CEMENT COMPOSITION FOR PAVEMENTS, FLOORS, WALKS, &c.

Specification forming part of Letters Patent No. 61,056, dated January 8, 1867.

*To all whom it may concern:*

Be it known that I, BERNARD DOUD, of Cortland, in the county of Cortland and State of New York, have invented a new and Improved Composition Cement for cellar-bottoms, stable-floors, walks, carriage-drives, pavements, vaults, and cisterns, and also for roofing; and I do hereby declare that the following is a full and exact description thereof.

To enable others skilled in the art to make and use my invention, I will proceed to describe its construction and use.

First, as to the pavement, walk, &c., I take coarse gravel, common stones, broken, or broken limestone, and, care being taken to have them thoroughly dry, mix the gravel or stone with coal-tar or pitch-tar, after the tar has been well heated, that it may flow readily. The stone or gravel should be well covered with tar. I then spread this material where the walk, floor, &c., is to be constructed, and roll or pound it down thoroughly. After being so rolled down it should constitute a body of from three to five inches thick. Where the nature of the ground requires a protection against frost, I mix with the above, as it is spread upon the ground, charcoal and salt, in proportion of four parts to one to twenty-four parts of gravel or stone. And in all cases (except where I use broken limestone, with which it is not required) I mix with the preparation above described quicklime, in proportion of one part to twenty, as it is spread upon the ground. This fixes and holds in composition the volatile properties of the tar, and renders the composition permanent. I then, for my top-dressing, and to complete the composition, take of sand sixty parts, coal-ashes or coal-dust, or both combined, twenty parts, and iron scales or filings five parts, and thoroughly mix them, and, care being taken that they are free from water, I mix them thoroughly with hot coal-tar or pitch-tar, making the compound of the right consistency to pack well. To this I then add one and one-fourth part of plaster-of-paris, two parts of water-lime, and one part of any good hydraulic cement, those of Rosendale and Kingston preferred. These last articles fix the elements in combination, and prevent the crumbling and breaking up of the cement which has been the chief difficulty hitherto. This preparation is then spread on and thoroughly rolled or pressed down, so that it, with the gravel bed, shall constitute one whole. The last preparation should be put on in quantities, so that, being thoroughly rolled down, it will be of one and a half to three inches in thickness.

Before the rolling is completed, to give the cement a uniform surface, I sprinkle on a light coat of very fine sand, or, if an ornamental drive or walk is desired, I use marble-dust instead of sand, and follow the sand or dust with the roller. In the place of coal-ashes and coal-dust, as stated above, I substitute, where most convenient and economical, brick-dust or burnt clay, pulverized. The ground should be so graded that the cement, when laid, will present a surface slightly dipping to one side, or rolling each way from the center, making a ready flow of the water from the cement.

For roofing, I first prepare the building by laying a tight board roof for a floor, upon which the cement composition is to be spread. Where the roof has been shingled I apply it without removing them. I then take the composition described above for the "top-dressing" to the cement for walks, &c., and sift the sand, coal-dust, and other articles used, so that the mixture shall be of very fine texture, and add to it sufficient of tar, thoroughly boiled, to make it of the consistency of paste; then apply it with a trowel or any suitable instrument, giving it a thickness of from one-fourth to five-eighths of an inch. Where it is laid upon a roof, shingled, it will require a little more body.

Finish and firmness are given this cement by passing a roller over it, when practicable. In the place of fine sand I use ground slate, where more convenient of access. Care should be taken that the boards upon which the cement is to be spread be well seasoned and dry. Where the boards are not well seasoned and dry I use a lining of felt-cloth, which is spread on, and nail or fasten down, and then apply the cement.

What I claim as my invention, and desire to secure by Letters Patent, is—

The composition cement for the construction of cellar and stable floors, vaults, walks, drives, and pavements, and roofing for buildings, &c., composed and applied in the manner substantially as set forth in the foregoing specification.

Dated at Cortland, October 10, 1866, in presence of witnesses.

BERNARD DOUD.

Witnesses:
  E. P. SLAFTER,
  J. A. BABCOCK.